March 25, 1924.
J. A. WATSON
1,488,081
VEHICLE LOCKING DEVICE
Filed Oct. 9, 1922
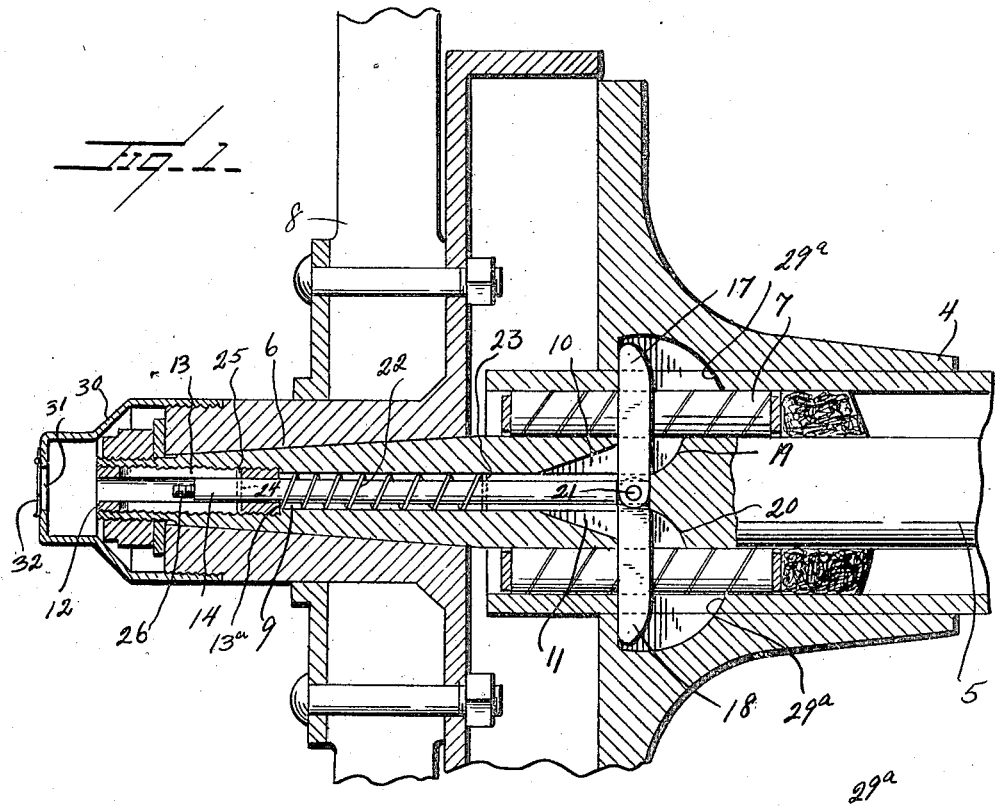
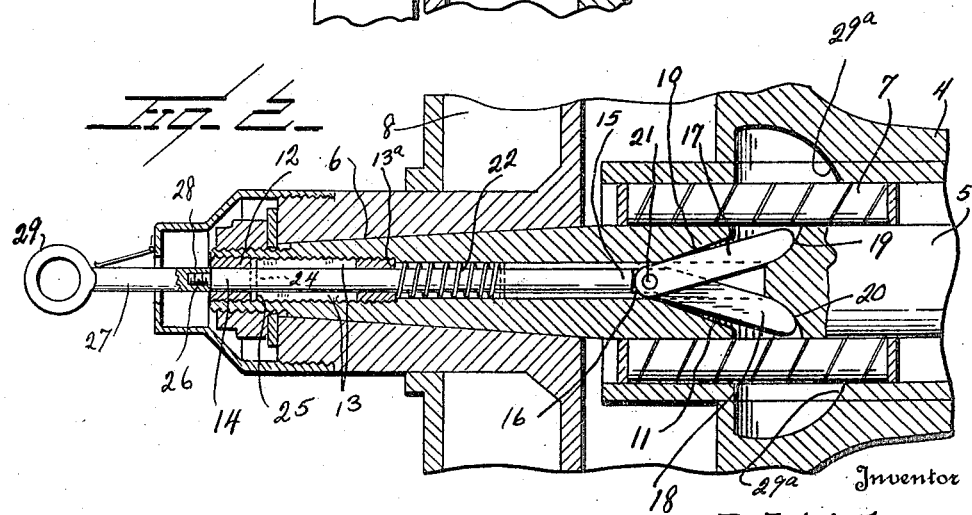
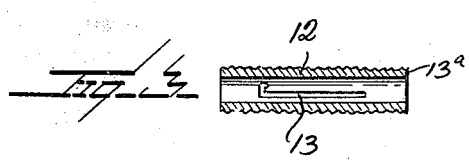
Inventor
J. A. Watson
By Watson E. Coleman
Attorney Patented Mar. 25, 1924.

1,488,081

UNITED STATES PATENT OFFICE.

JOHN A. WATSON, OF CINCINNATI, OHIO.

VEHICLE LOCKING DEVICE.

Application filed October 9, 1922. Serial No. 593,293.

*To all whom it may concern:*

Be it known that I, JOHN A. WATSON, a citizen of the United States, residing at Cincinnati, in the county of Hamilton and State of Ohio, have invented certain new and useful Improvements in Vehicle Locking Devices, of which the following is a specification, reference being had to the accompanying drawings.

This invention relates to locking devices, and more particularly to locking devices for axles and shafts.

It is an object of the invention to provide a locking device of this character arranged to lock an axle and the wheel thereof against rotation without exposing any portion of the locking means.

It is another object of the invention to provide a locking device of this character which is mounted within the axle or shaft and arranged to not only prevent rotation of the wheel but also the axle.

It is also an object of the invention to provide a device of this character which is substantially automatic in its locking operation and which cannot be accidentally retracted from its locked position without the use of a key.

It is a further object of the invention to provide a locking device of this character movably mounted within the axle or shaft and adapted to be disposed in a compact form within the axle when not in use without interfering with the rotation of the axle and wheel.

With these and other objects in view, the invention consists in the improved construction and arrangement of parts to be hereinafter more particularly described, fully claimed and illustrated in the accompanying drawings, in which:—

Figure 1 is a longitudinal sectional view showing the invention applied to an axle and in its locked position;

Figure 2 is a longitudinal sectional view showing the mechanism in its unlocked position within the axle; and Figure 3 is a detailed sectional view of the sleeve disposed within the the bore of the axle.

Referring to the drawings, 4 designates an axle housing in which an axle or shaft 5 is mounted. The axle is provided with the usual tapered or reduced ends 6 and also provided with roller bearings 7. A wheel 8 is mounted on and secured to the end of the shaft in the usual manner. The structure above described is well known and forms no part of the invention.

It is intended that either end or both ends of the shaft be provided with a central longitudinally extending bore 9. Branch passages 10 and 11 are provided in the axle and communicate with the bore 9, the passages 10 and 11 extending in opposite directions and through the outer face of the axle. It is intended that these passages should terminate beneath the roller bearings. In some makes of machines or automobiles it is desirable that the passages terminate a considerable distance inwardly of the bearings. However, the operation of the device is the same, regardless of the position of the branch members. The outer end of the bore 9 is reduced and threaded for the reception of a sleeve 12. This sleeve is provided with a pair of opposed bayonet slots 13, these slots are closed on one side by the adjacent walls of the bore. The inner end of the sleeve is intended to project a slight distance inwardly of the bore to provide a seat 13ª the purpose of which will be hereinafter described.

Slidable within the bore 9 is a locking rod 14, the length of said rod corresponding substantially to the length of the bore 9. The end 15 of the locking rod is provided with a reduced extension 16. In connection with the locking rod, locking bolts 17 and 18 are provided, each of said bolts consisting of a length of material curved longitudinally so as to extend through an adjacent branch leading from the bore. The inner end of each of the bolts 17 and 18 is reduced and provided with an opening. The reduced end portion of the bolt 17 is intended to engage the side 19 of the extension 16, while the reduced end portion of the bolt 18 is intended to engage the opposite side 20 of the reduced extension 16. A pivot pin 21 is passed through the registering openings of the bolts and an opening provided in the extension 16 so as to permit pivotal movement of the bolts relative to each other and the locking rod. The bolt 17 is intended, when in use, to pass through the branch passage 10, while the bolt 18 is intended to pass through the branch passage 11. In view of the novel pivotal connection of said bolts, they are adapted to substantially lie one upon the other in alignment with the locking bolt and within the bore 9 when the device is disposed in its retracted or unlocked position.

Surrounding the locking bolt 14 is an expansion spring 22, one end of said spring engaging a pin 23 carried by the inner end portion of the locking rod, while the opposite end of the spring is intended to engage the seat 13ª of the sleeve 12. A pin 24 is carried by the outer end portion of the locking rod. The end portions 25 of the pin 24 project a considerable distance beyond the locking rod and are intended to enter the bayonet slots 13 in the sleeve 12. The extremity 26 of the outer end portion of the locking rod is reduced and threaded and adapted to be engaged by a key 27. This key comprises a threaded socket member 28 and a handle member 29. The purpose of the key is to permit a hold to be obtained on the locking rod to retract the locking rod and the bolts from their locked positions.

In assembling the device the locking rod is placed within the bore 9 so that the outer ends of the locking bolts 17 and 18 are disposed adjacent the inner ends of passages 10 and 11. The ends 25 of the pin 24 are disposed within the bayonet slots 13 so as to prevent expansion of the spring 22 and movement of the locking mechanism to its locked position. When the pin 24 is thus disposed the lock bolts 17 and 18 are positioned substantially in parallel relation to each other and in alignment with the rod 14 within the bore 9. The outer end of the locking rod in this instance projects a slight distance beyond the end of the axle.

When it is desired to lock the shaft or axle against rotation the locking rod may be actuated by the application of the key 27 to the reduced end 26 of the locking rod so as to release the ends of the pin 25 from their locked position within the bayonet slots and permit said pin to move within the bayonet slots through the expansion of the spring 22. This expansion of the spring also causes sliding movement of the locking rod within the bore and urges the bolts 17 and 18 outwardly of the branch passages 10 and 11 and between the rollers of the roller bearings into recesses 29ª of the axle housing 4, thus locking the axle against rotation. In view of the power of the spring 22 the locking bolts 17 and 18 will be maintained in their locked positions indefinitely and the only possible way of retracting them is by the application of the key 27 to the reduced end 26 of the locking rod. This permits the expansive force of the spring to be overcome so as to move the end portions 25 of the pin 24 in the bayonet slots to their locked positions, thus returning the locking bolts 17 and 18 to the bore 9. In order to facilitate the use of the key 27 the hub cap 30 is provided with an opening 31 covered by a drop cover 32 which permits the key to be inserted without removing the hub cap.

From the foregoing it will be readily seen that this invention provides a novel locking device particularly adapted for vehicles to not only prevent rotation of the wheel, but rotation of the axle as well. In addition to this, all portions of the locking device are concealed within the axle so that it would be difficult for an unauthorized person to even locate the locking means and even then actuation of the locking means would be impossible without the use of a key to permit the end of the locking rod to be firmly gripped and moved against the tension of the spring 22. All of these features are possessed by a device which is composed of only a small number of simple parts and can be incorporated in any axle.

What is claimed is:—

1. A locking device of the character described comprising a shaft having a bore extending through the ends thereof, and branch passages leading from the bore, and locking means slidable in the bore and branch passages and arranged to engage a portion of the housing of the shaft.

2. A locking device of the character described comprising a shaft having a bore extending through the ends thereof, and branch passages leading from the bore, locking means slidable in the bore and branch passages and arranged to engage a portion of the housing of the shaft, and means for urging said locking means to its locked position.

3. A locking device comprising a shaft having a bore extending through one end thereof, and branch passages leading from the inner end of the bore in opposite directions, a locking rod slidable within the bore, locking bolts pivoted to the inner end of the locking rod and arranged to extend through the branch passages, means carried by the locking rod for urging the locking bolts into the branch passages, and means carried by the locking rod and adapted to engage the axle for retracting the locking bolts and holding the same within the bore.

4. A locking device comprising an axle housing, an axle within said housing, said axle being provided with a bore, said bore extending through the end of the axle, said axle being also provided with opposed branch passages leading from the outer face of the axle to the bore, a locking rod slidable within the bore, locking bolts pivoted to the inner end of the rod and adapted to be disposed in overlapping relation within the bore when in their unlocked position and to extend through branch passages to their locked position, a spring carried by the rod within the bore, a holding member carried by one end of the bore, the ends of said holding member being movable in bayonet slots provided in the walls of the bore, said spring being adapted to urge the locking bolts to their locked positions upon release of the holding member from the bayonet slots, and means engaged with the outer end of the rod for causing movement of the locking rod and locking bolts to their unlocked positions against the tension of the spring.

5. A locking device comprising an axle housing, a roller bearing carried by the end of the axle, said end portion of the axle having a bore extending through the end face thereof, said axle having branch passages extending in opposite directions from the bore and terminating beneath the roller bearing, a locking rod, locking bolts pivoted to one end of the rod and arranged for movement in opposite directions and for movement into parallel relation to each other, said rod and locking bolts being movable within the bore, a spring carried by the rod for urging the locking bolts through the branch passages and through the adjacent portions of the roller bearings to a position substantially at right angles to the rod, a pin carried by the outer end of the rod, a sleeve disposed within the bore, said sleeves having bayonet slots arranged to receive the end of the pin, said pin being adapted to hold the rod in its retracted position through the medium of the slots, the outer end of said rod being reduced and threaded, a key member detachably engaged with said threaded end for moving the locking bolts inwardly of the branch passages and into the bore through the medium of the rod.

In testimony whereof I hereunto affix my signature.

JOHN A. WATSON.